April 26, 1949.                 H. K. FOSTER                    2,468,259
                                PRESSURE COOKER
                              Filed Dec. 23, 1944
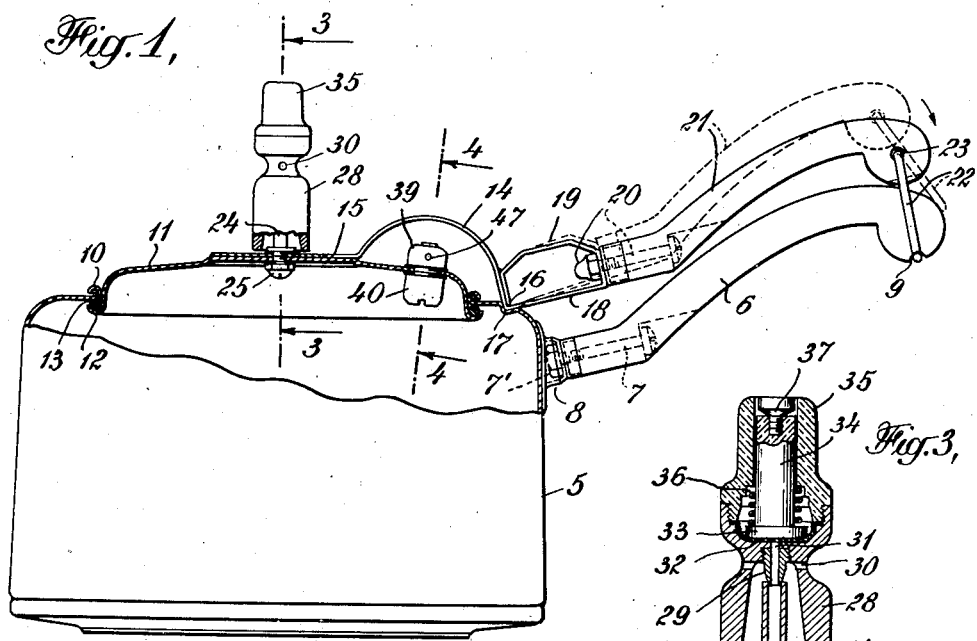
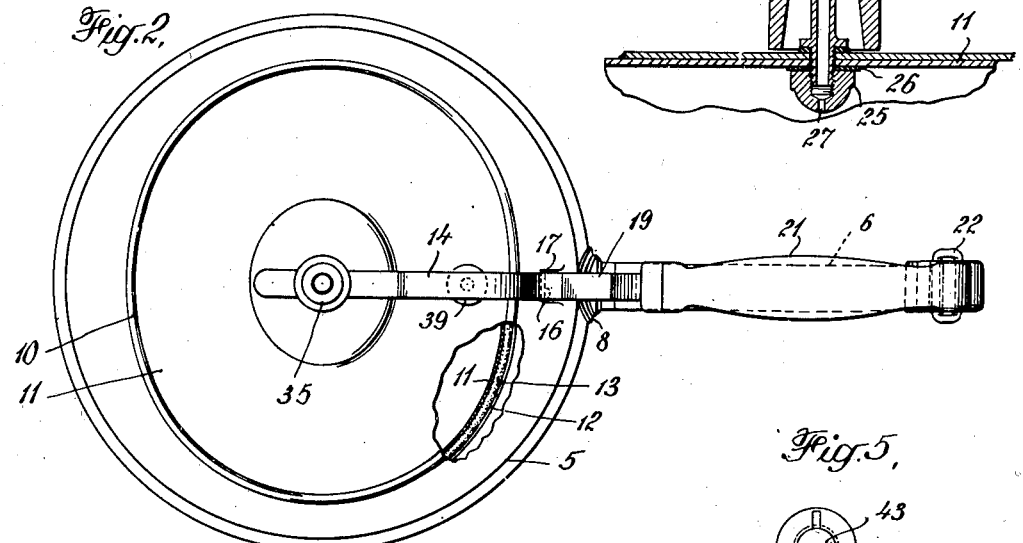
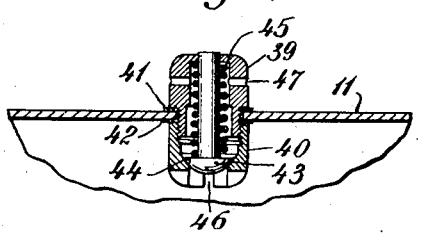
INVENTOR
Hoyt K. Foster
BY
ATTORNEYS Patented Apr. 26, 1949

2,468,259

UNITED STATES PATENT OFFICE 2,468,259

PRESSURE COOKER

Hoyt K. Foster, Hollis, N. Y., assignor to S. W. Farber, Inc., Brooklyn, N. Y., a corporation of New York Application December 23, 1944, Serial No. 569,456

2 Claims. (Cl. 220—55)

This invention relates to cooking utensils and particularly to the type commonly described as pressure cookers, in which food is subjected to heat and steam pressure generated within the utensil.

Various forms of pressure cookers have been suggested heretofore. None of these fulfills the ideal requirements of a receptacle of relatively light weight which can be handled easily, having a closure which is secure and easy to manipulate and provided with a pressure indicator of simple and reliable form and safety devices which insure against excessive internal pressure.

It is the object of the present invention to afford a pressure cooker having numerous advantages not heretofore available in utensils of that type.

A further object of the invention is the provision in a pressure cooker of a closure which can be secured and released with a minimum of effort and assurance against the possibility of scalding the user with steam.

Another object of the invention is the provision of a simple pressure relief valve and indicator and an improved auxiliary relief valve which together afford full security against the development of excessive pressures.

Other objects and advantages of the invention will be apparent as it is better understood by reference to the following specification and the accompanying drawing, in which a preferred embodiment of the invention is disclosed and illustrated. In the drawing, Fig. 1 is an elevation partially in section of the cooker;

Fig. 2 is a top plan view thereof;

Fig. 3 is an enlarged detail in section illustrating the pressure relief valve and indicator;

Fig. 4 is a sectional view illustrating the auxiliary pressure relief valve; and Fig. 5 is a bottom plan view of the structure shown in Fig. 4.

Referring to the drawing, 5 indicates a receptacle which may be of any suitable form and constructed of metal of a gauge adapted to withstand the pressure for which the apparatus is designed. The receptacle is preferably made of stainless steel, but any other metal of suitable strength may be substituted therefor. A handle 6 is secured by a screw 7 and nut 7' to a boss 8 which may be fastened in any suitable manner, for example by spot welding, to the wall of the receptacle 5. The end of the handle is provided with a notch 9, the function of which will presently appear. The opening at the top of the receptacle is surrounded by a bead 10 formed by rolling or otherwise to strengthen the edge of the opening. As indicated in Fig. 2, the opening is of elliptical form. This opening may be of any other non-circular form to permit the introduction of the cover 11.

The cover 11 conforms generally to the contour of the opening in the receptacle 5 and is provided with a curled edge 12 to support a gasket 13 of rubber, natural or synthetic, or other suitable material adapted to be compressed against the inner surface of the edge of the opening to afford a tight seal. A resilient member 14 is secured at 15 to the cover 11 and is formed with an angle 16 which is adapted to rest in a depression 17 in the surface of the receptacle 5 affording a fulcrum. The member 14 is extended at 18 and bent to afford a stiffening leg 19 which is connected by a screw 20 to a handle 21. A bail 22, supported in an opening 23 in the handle 21, is adapted to fall into the notch 9 in the handle 6. With the bail 22 thus engaged, the portion of the resilient strip 14 between its connection to the closure 11 and the fulcrum portion 16 causes a force to be exerted on the closure in a direction to urge the peripheral edge portion of the closure which carries the gasket 13 against the inner surface of the receptacle surrounding the opening at the top of the receptacle. To release the cover 11, the bail 22 is removed from the notch 9, permitting the handle 21 to move to the dotted position in Fig. 1. This relieves the tension of the member 14. The cover 11 can then be turned through an angle of approximately 90°, tilted and removed from the opening in the receptacle 5.

A tube 24 is secured by a nut 25 and washer 26 in a central opening in the cover 11 and projects upwardly therefrom. The nut 25 is provided with transverse slots 27 permitting steam to pass upwardly through the tube 24 but preventing clogging of the tube by particles of food from the cooker. A cap 28 of substantial weight, having a nipple 29 threadedly mounted therein, affords a pressure relief valve which will permit the escape of steam after the pressure has risen to a predetermined point, for example 15 pounds per square inch. The nipple 29 rests in the opening at the end of the tube 24 to normally prevent the escape of steam. Lateral passages 30 permit steam to escape when the nipple 29 is lifted from its seat.

The nipple has a central opening 31 extending to a diaphragm 32 which is preferably of rubber and which supports a flange 33 on an indicator rod 34 extending upwardly through a handle 35, preferably made of any suitable heat insulating material. A spring 36 surrounds the rod 34, bearing upon the flange 33. The spring is under sufficient tension so that the rod 34 will be lifted only as the pressure behind the diaphragm 32 increases approximately to the point at which it is to be maintained within the cooker. The rod 34 has a mark 37 thereon which, when exposed by upward movement of the rod, indicates that the desired pressure has been reached and is being maintained. Removal of the cap 28 immediately vents the interior of the receptacle 5 so that the steam may escape. The pressure will be relieved and the cover may be removed in the manner hereinbefore described.

To insure against the development of excessive pressures, in the event of failure of the primary relief valve to operate, an auxiliary valve is provided in the cover 11. The valve consists of two members 39 and 40 threadedly connected and adapted to be disposed in an opening in the cover 11 with gaskets 41 and 42 disposed on opposite sides of the cover to insure a tight seal. A valve 43 is held against a seat 44 by a spring 45 housed within the members 39 and 40. The member 40 is slotted at 46 to ensure free access of steam and to prevent particles of food from clogging the opening. When the valve 43 is lifted from its seat by internal pressure, steam escapes through lateral openings 47 in the member 39. The spring 45 is under suitable tension so that steam is not released until after a predetermined pressure has been attained.

As is evident from the foregoing description, after the cover 11 has been inserted and is held by the tension of the member 14 with the gasket 13 resting against the inner edge of the opening, the cap 28 is placed in position. Thereafter heat may be applied to the receptacle and pressure is built up by the evaporation of water therein until the desired pressure is obtained. The pressure will be indicated by the upward movement of the rod 34. If any greater pressure develops, the cap 28 will be lifted and steam will escape through the openings 30. Should, by any chance, the passage through the tube 24 be clogged, the auxiliary valve will become operative to relieve the pressure. When the cooker is to be opened, the cap 28 may be lifted to vent the receptacle, or the receptacle may be permitted to cool sufficiently to relieve the pressure, whereupon the cover 11 may be released and turned sufficiently so that it may be removed from the receptacle.

The structure as described is simple and effective. It is light in weight and can be easily handled. The cover can be manipulated even when the receptacle is hot, without danger of burning the user. Since the cover is held closed by internal pressure, it cannot be removed inadvertently until the receptacle has been relieved of pressure. Because of the primary and auxiliary relief valves, excessive internal pressures cannot be developed and hence the utensil is safe even in the hands of inexperienced users.

Various changes may be made in the details of the structure and the arrangement of the parts without departing from the invention or sacrificing the advantages thereof.

I claim:

1. A pressure cooker comprising a receptacle having an opening and a fulcrum seat at the top side thereof, a closure insertable through the opening and having a peripheral edge portion adapted to engage the inner surface of the receptacle surrounding the opening, a handle, a strip of resilient metal connected at one end portion to the closure and bent upon itself at its other end portion to form a stiffening leg, one end of said stiffening leg being secured to the handle and the other end thereof having an angularly bent portion providing a fulcrum adapted to engage said fulcrum seat, the portion of the resilient strip between the end portion connected to the closure and the fulcrum, when unrestrained, biasing the fulcrum away from the fulcrum seat, and means for holding the fulcrum against the fulcrum seat, whereby said portion of the resilient strip causes a force to be exerted on the closure in a direction to urge the peripheral edge portion thereof against the inner surface of the receptacle surrounding the opening therein.

2. A pressure cooker comprising a receptacle having an opening and a fulcrum seat at the top side thereof, a handle for the receptacle, a closure insertable through the opening and having a peripheral edge portion adapted to engage the inner surface of the receptacle surrounding the opening, a strip of resilient metal connected at one end portion to the closure and bent upon itself at its other end portion to afford a stiffening leg, a handle for the closure secured to one end of said stiffening leg, the other end of said stiffening leg having an angularly bent portion providing a fulcrum adapted to engage said fulcrum seat, the portion of the resilient strip between the end thereof connected to the closure and the fulcrum being upwardly bowed and, when unrestrained, biasing the fulcrum away from the fulcrum seat, and latching means carried by the closure handle and engageable with the handle of the receptacle for holding the fulcrum against the fulcrum seat, whereby said upwardly bowed portion of the resilient strip causes a force to be exerted on the closure in a direction to urge the peripheral edge portion thereof against the inner surface of the receptacle surrounding the opening therein.

HOYT K. FOSTER.

REFERENCES CITED

The following references are of record in the file of this patent:

UNITED STATES PATENTS

| Number | Name | Date |
|---|---|---|
| 377,124 | Snyder et al. | Jan. 31, 1888 |
| 1,844,970 | Muller et al. | Feb. 16, 1932 |
| 2,188,735 | Grundstrom | Jan. 30, 1940 |
| 2,200,903 | Stephens | May 14, 1940 |
| 2,246,393 | Sperry | June 17, 1941 |
| 2,282,011 | Vischer, Jr. | May 5, 1942 |
| 2,301,724 | Vischer, Jr. | Nov. 10, 1942 |

FOREIGN PATENTS

| Number | Country | Date |
|---|---|---|
| 291,969 | Great Britain | June 14, 1928 |
| 33,108 | France | Feb. 14, 1928 |
| (Addition to No. 630,277) | | |